United States Patent [19]

Ostwald

[11] 4,389,076

[45] Jun. 21, 1983

[54] ARRANGEMENT FOR THE SUPPLY OF PRESSURE TO BRAKE SLIP CONTROL APPARATUS

[75] Inventor: Fritz Ostwald, Dreieich, Fed. Rep. of Germany

[73] Assignee: ITT Industries, Inc., New York, N.Y.

[21] Appl. No.: 255,123

[22] Filed: Apr. 17, 1981

[30] Foreign Application Priority Data

May 21, 1980 [DE] Fed. Rep. of Germany ....... 3019364

[51] Int. Cl.$^3$ .............................................. B60T 8/10
[52] U.S. Cl. ........................................ 303/92; 303/85
[58] Field of Search .................. 303/9, 92, 113, 114, 303/115, 116, 85

[56] References Cited

U.S. PATENT DOCUMENTS 2,814,363 11/1957 Phillips .............................. 303/85 X
3,532,391 10/1970 Klein ................................... 303/116
4,278,300 7/1981 Bacher ............................ 303/116 X

*Primary Examiner*—Duane A. Reger
*Attorney, Agent, or Firm*—John T. O'Halloran; Alfred C. Hill

[57] ABSTRACT

A device to provide the control pressure required in the wheel brake cylinder of automotive vehicles incorporating brake slip control apparatus. While it is known to make available the control pressure by a pump-accumulator system, the present invention provides a replaceable pressure reservoir with a highly expansive medium. The fluid reservoir has an exhaustible volume of pressure fluid and a release device actuatable by slip control electronics so that the control pressure is generated only at the beginning of each controlled braking action. This arrangement has a considerable advantage related to manufacturing costs compared to the known arrangements, since there is not need for the pump-accumulator system.

15 Claims, 5 Drawing Figures

ARRANGEMENT FOR THE SUPPLY OF PRESSURE TO BRAKE SLIP CONTROL APPARATUS

BACKGROUND OF THE INVENTION

The present invention relates to an arrangement for the supply of pressure to brake slip (antiskid) control apparatus during braking operations in automotive vehicles including a source of pressure to supply the necessary control pressure in the wheel brake cylinders.

The basic principle of current brake slip control apparatuses include increasing, decreasing, or maintaining constant, the pressure in the wheel brake cylinders in a specific sequence. This is termed a brake control or philosophy. The control commands are generated by an electronic control unit connected to wheel velocity sensors and are issued to appropriate control units if excessive slip values between vehicle tires and road surface are detected. First, it is known to have the control pressure generated by a separate hydraulic pump and a hydraulic accumulator communicating with the pump. Further, it is also known to charge an accumulator which is provided with a pressure-operated switch by a power steering pump already available in the motor vehicle, so that the control pressure is available should the necessity for a brake control action arise. While the control pressure generating structure initially referred to necessities high constructional expenditure and corresponding manufacturing cost, it is considered a disadvantage in the second control pressure generating arrangement described that the steering behavior of the automotive vehicle may change if the power steering pump is bled during a controlled braking action.

Accordingly, in the known systems the control pressure required for a controlled braking action is held available at all times althrough braking operations assisted by the brake slip control apparatus occur at only very large intervals. It is assumed that the operator of an automotive vehicle equipped with a brake slip control apparatus, driving normally in weather conditions usual in the temperate zone and under normal vehicle operating conditions, is required to utilize his brake slip control apparatus only every 5,000 km (kilometers) on an average.

Further, special restraint systems to protect the occupants of automotive vehicles have become known, for instance German Patent DE-AS No. 2,163,919, including essentially an inflatable bag which in the event of a collision is filled with gas within an extremely short period of time to thereby provide an impact protection for the vehicle occupants from the windshield or from parts of the interior trim of the vehicle. In the restraint systems described, the gas required to inflate the bag is produced by a chemical propellant which is, for example, ignited by a deceleration sensor fitted to the vehicle.

SUMMARY OF THE INVENTION

It is an object of the present invention to provide a simple arrangement of the type initially referred to hereinabove which is characterized by a low power loss and makes the necessary control pressure available exclusively when the brake slip control apparatus responds whereby the constructional expenditure is substantially reduced.

A feature of the invention is the provision of an arangement to supply pressure to a brake slip control apparatus during braking operations of automotive vehicles comprising a source of pressure fluid to supply necessary control pressure in wheel brake cylinders, the source of pressure fluid including a reservoir containing a pressure fluid coupled to a control arrangement of the slip control apparatus, a highly expansive medium disposed in the reservoir capable of acting on the pressure fluid in the reservoir, and a device associated with a selected one of the pressure fluid and the expansive medium connected to an electronic control unit of the slip control apparatus to actuate the device at the beginning of a braking operation having locked wheels to supply the pressure fluid to the control arrangement.

In an arrangement of this type it is considered a particular advantage that the necessary control pressure is made available exclusively in the event of a braking with locked wheels, resulting in a drastic reduction in the constructional expenditure with regard to the supply of pressure to brake slip control apparatuses. In another embodiment, a hydraulic pressure accumulator known per se is provided which pressurizes the pressure control unit only in the presence of a locked condition, for example, by a solenoid valve. Further, it is advantageous for reasons of safety to arrange several such sources of pressure in parallel and to have these successively actuated by the electronic control unit on several successive braking actions with locked wheels. Still further, it will be an advantage to inform the vehicle operator of the status of his sources of pressure to make him aware of a necessary replacement. Finally, quick-disconnect couplings are provided for pressure-source exchange. The sources of pressure may be expendable cartridges or of the rechargeable type.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
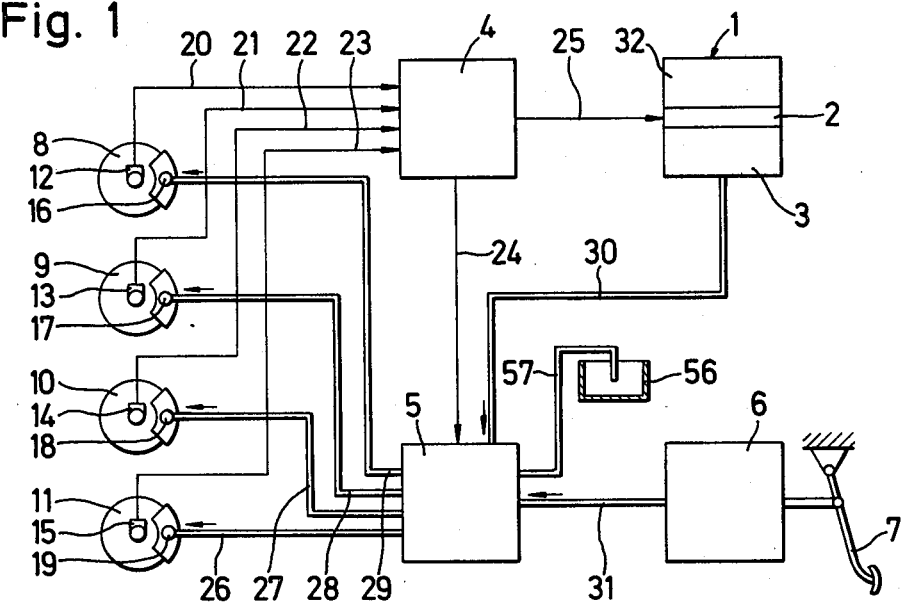
FIG. 1 is a block diagram of a first embodiment of a brake slip control apparatus having a source of pressure in accordance with the principles of the present invention.

Like parts have been assigned like reference numerals in FIGS. 1 through 5.

In FIG. 1, reference numeral 1 designates a source of pressure including a release device 2 and a fluid reservoir 3. Further, reference numeral 4 designates a brake slip electronic control unit, reference numeral 5 a pressure control unit, reference numeral 6 a brake booster and reference numeral 7 a brake pedal. Further constituents of the block diagram are four vehicle wheels 8, 9, 10 and 11, four wheel velocity sensors 12, 13, 14 and 15, four wheel brake cylinders 16, 17, 18 and 19, several electrical lines 20, 21, 22, 23, 24 and 25, and several pressure lines 26, 27, 28, 29, 30 and 31.

The components identified above are interconnected as follows. Electronic control unit 4 is connected to wheel velocity sensors 12, 13, 14 and 15 via electrical lines 20, 21, 22 and 23, respectively. Pressure control unit 5 is connected to wheel brake cylinders 16, 17, 18 and 19 through lines 26, 27, 28 and 29, respectively. In addition, pressure control unit 5 is connected to electronic control unit 4 via electrical line 24. Connected to pressure control unit 5 is a pressure line 31 which leads to brake booster 6 which in turn is actuatable by brake pedal 7. Electronic control unit 4 is electrically connected to release device 2 of pressure source 1 via line 25. Finally, line 30 establishes a connection between fluid reservoir 3 of pressure source 1 and pressure control unit 5, and a return reservoir 56 is connected to pressure control unit 5 via a return line 57.

The arrangement illustrated is characterized by the following mode of operation. In normal operation and under non-critical braking conditions, pressure control unit 5 is open to allow passage of the brake pressure built up in brake booster 6 through line 37 and lines 26, 27, 28 and 29 directly to wheel brake cylinders 16, 17, 18 and 19. If electronic control unit 4 detects inadmissibly high slip values at vehicle wheels 8, 9, 10 and 11, it will deliver, via electrical line 24, a signal to pressure control unit 5 which will then initiate and execute a braking action which is controlled with regard to the wheel slip. Simultaneously with the drive command to pressure control unit 5, an electrical signal will be applied to line 25, causing activation of release device 2 in pressure source 1. A highly expansive medium provided in a chamber 32 of pressure source 1 will then act on the fluid available at the fluid reservoir and displace it through pressure line 30 so that the pressure required for a controlled braking action is available at pressure control unit 5. The unpressurized fluid present on termination of the control action will be returned to return reservoir 56 via return line 57.

Figure 2:
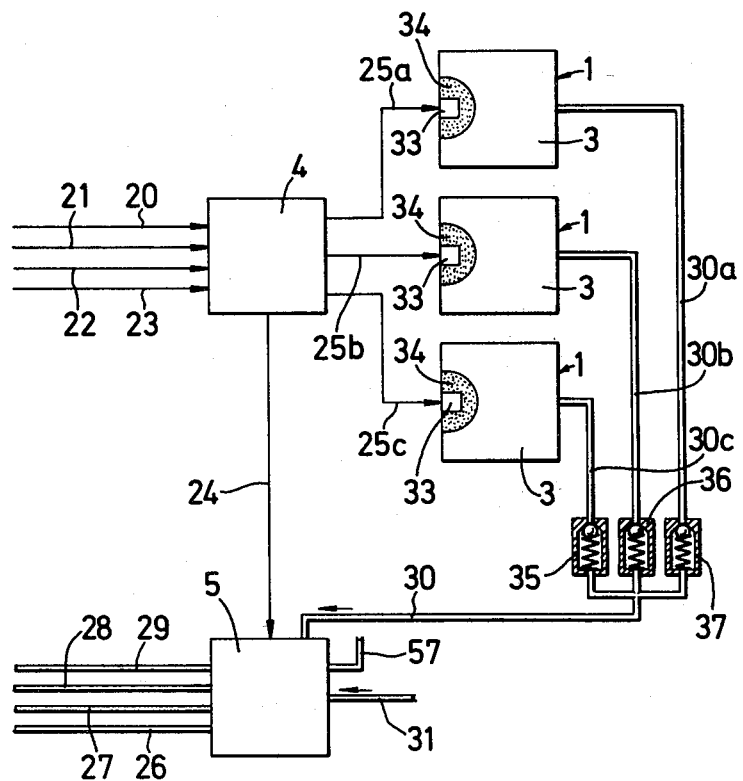
FIG. 2 is a block diagram of a second embodiment of a brake slip control apparatus having several parallel sources of pressure in accordance with the principles of the present invention.

FIG. 2 shows an embodiment incorporating three sources of pressure 1 which are connected to electronic control unit 4 via three separate electrical lines 25a, 25b and 25c. Each pressure source 1 is equipped with an ignition device 33 and a pyrotechnic propellant 34 surrounding ignition device 33. Fluid reservoirs 3 of pressure sources 1 are combined, via lines 30a, 30b and 30c and check valves 35, 36 and 37 inserted in the lines, in a common junction point opening into pressure line 30 to thus establish a connection to pressure control unit 5. Vehicle wheels 8, 9, 10 and 11 are connected to electronic control unit 4 and pressure control unit 5 in the manner known from FIG. 1. The same applies to brake booster 6. For this reason, the parts mentioned are not shown.

The arrangement illustrated operates to cause successive actuation of ignition devices 33 of pressure sources 1 via electrical lines 25a, 25b and 25c in the presence of several successive slip control braking actions. If a suitable electrical signal is applied to one of the lines 25a, 25b and 25c, a propellant 34 will expand promptly, and the fluid of pressure source 1 concerned will be displaced to pressure control unit 5. The illustrated paralleling of three pressure sources 1 provides a substantially increased safety factor. Check valves 35, 36 and 37 direct the contents of each pressure source 1 to pressure control unit 5 only, and not to another pressure source 1 already discharged. The volume of each pressure source may be empirically dimensioned so as to be sufficient for an "average" control cycle. In an arrangement of FIG. 2, accordingly, three control cycles may be executed.

Because the operator of a vehicle equipped with a brake slip control apparatus does not necessarily become aware of the response of his apparatus, it will be advantageous with a view to a timely replacement of pressure sources 1 if in another embodiment of this invention information about the number of pressure sources 1 used up is communicated to the vehicle operator. For this purpose, the provision of a wire strain gauge to pressure source 1, which is part of a Wheatstone bridge, may be considered, for example. The voltage pulse occurring at the bridge as a result of an expansion of the pressure source housing could, for instance, drive a bistable multivibrator which has suitable acoustical or optical signalling devices connected to its output. On the other hand, this problem could also be solved by pressure operated switches provided in pressure sources 1 in combination with electrical or mechanical holding devices.

Figure 3:
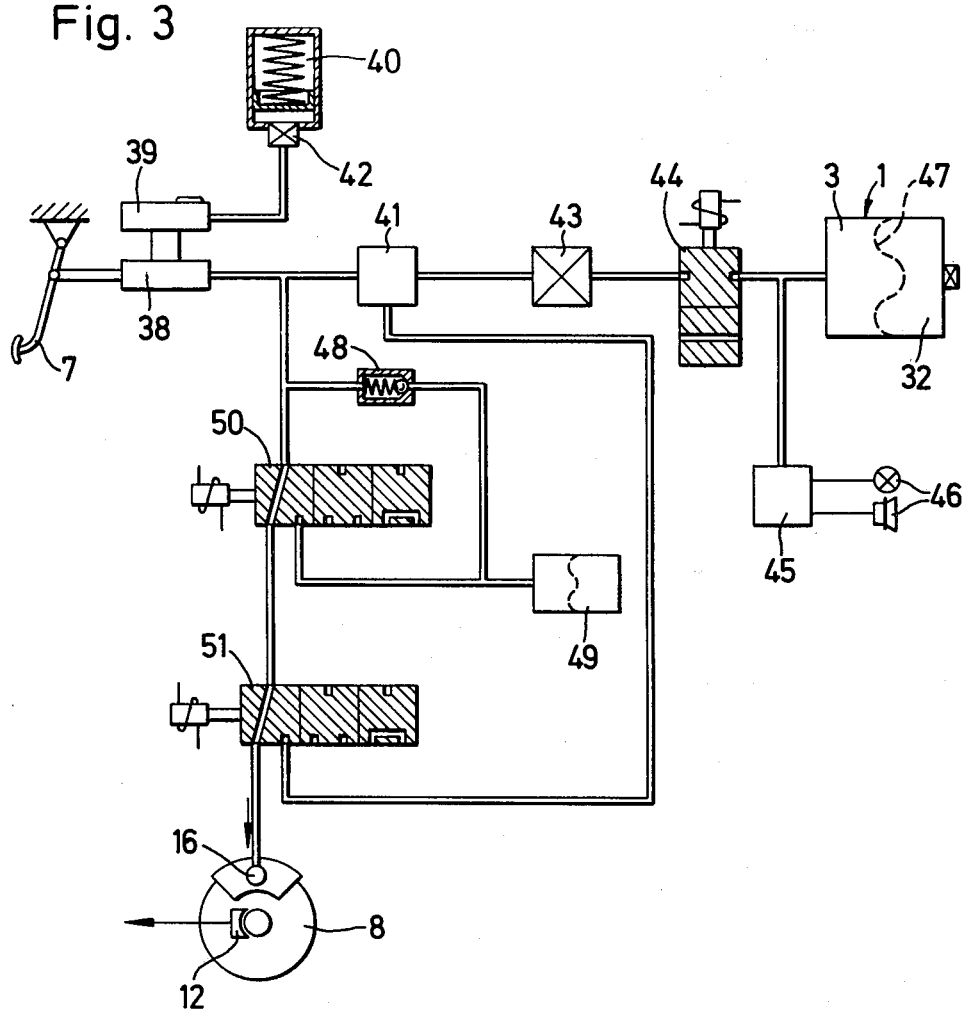
FIG. 3 is a block diagram of a third embodiment of a brake slip control apparatus in accordance with the principles of the present invention.

FIG. 3 shows a brake slip control apparatus constructed for a vehicle wheel 8, including a brake pedal 7, a master brake cylinder 38, a reservoir 39, a low-pressure accumulator 40, a pressure regulator 41, two disconnect couplings 42 and 43, a solenoid valve 44, a pressure operated switch 45, signalling devices 46, a separator 47, a check valve 48, an attenuation storage 49 and two further solenoid valves 50 and 51. Further constituents of the control apparatus are a pressure source 1, a wheel velocity sensor 12 and a wheel brake cylinder 16. Still further, the apparatus comprises a number of pressure lines. In this embodiment, pressure source 1 includes a fluid reservoir 3 and a chamber 32 pressurized to a high gas pressure. A separator 47 which for example may be a diaphragm or another equivalent movable component is inserted between the media mentioned.

The brake slip control arrangement of FIG. 3 is characterized by the following mode of operation. In the illustrated inactive position of solenoid valves 50 and 51, the brake pressure generated in master brake cylinder 38 by a force acting on brake pedal 7 is directly transmitted to wheel brake cylinder 16 via solenoid valves 50 and 51. If an electronic control unit (not shown) detects inadmissibly high slip values above a fixed switch threshold on vehicle wheel 8, appropriate electrical control commands will cause solenoid valves 50 and 51 to assume a middle position in which wheel brake cylinder 16 is isolated from master brake cylinder 38, so that the wheel brake cylinder pressure is held constant independent of the master brake cylinder pressure. A pressure increase in master brake cylinder 38 has no effect upon the wheel brake cylinder pressure. If the electronic control unit issues the command "increase pressure", solenoid valve 50 will return to its inactive position. If the signal "decrease pressure" occurs, solenoid valve 50 will assume the next position. The wheel brake cylinder pressure will then drop down to a value which ensures restart of wheel 8 and whose magnitude is determined by volume and pressure characteristic of attentuation storage 49. With this cycle of wheel 8, the electronic control unit will issue the signal "increase pressure", resulting in a suitable signal being delivered to solenoid valve 51 which will assume a position in which wheel brake cylinder 16 is connected to pressure regulator 41 so that fluid from pressure source 1 is admitted via solenoid valve 51 into wheel brake cylinder 16 and increases the pressure there.

The pressure regulator 41 communicates with master brake cylinder 38. It is of the type known a pressure reducing valve having the characteristic feature of reducing the high pressure arriving from pressure source 1 in the line leading to solenoid valve 51, with the magnitude of this pressure being similar to that of the master cylinder pressure. It is thereby ensured that the brake pressure predetermined by the vehicle operator at the brake pedal 7 is not substantially exceeded during the brake pressure control actions.

The control action will be restarted if this pressure increase leads again to high slip values.

If the pressure in master brake cylinder 38 disappears after a braking action, attenuation storage 49 causes the fluid coming from pressure source 1 to be supplied via check valve 48, master brake cylinder 38 and reservoir 39 into low-pressure accumulator 40 which will take the fluid of pressure source 1 after the fluid has been used. Connected to pressure source 1 is a pressure-operated switch 45 supplying information on the status of use of pressure source 1 in combination with optical and/or acoustical signalling devices.

It will be apparent from the foregoing that low-pressure accumulator 40 will be charged in the same degree as fluid reservoir 3 becomes depleted. Accordingly, pressure source 1 and low-pressure accumulator 40 are to be exchanged following depletion of pressure source 1. This is done by disconnect couplings 42 and 43 of FIG. 3.

Figure 4:
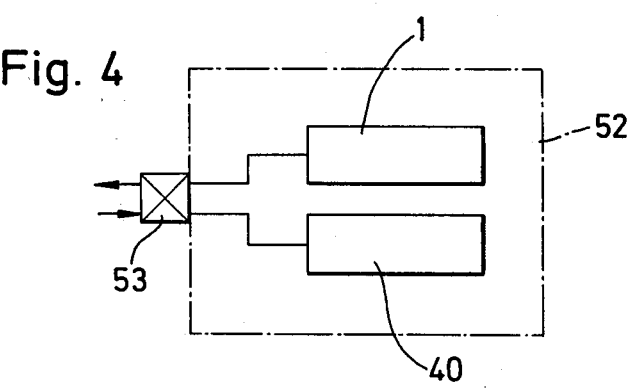
FIG. 4 is a block diagram of an advantageous embodiment of a source of pressure in accordance with the principles of the present invention.

According to FIG. 4, pressure source 1 and low-pressure accumulator 40 are disposed in a common housing 52 and a common disconnect coupling 53 with two line passageways substituted for the two individual disconnect couplings 42 and 43. In this manner, the necessary steps for exchanging the components mentioned are minimized.

Figure 5:
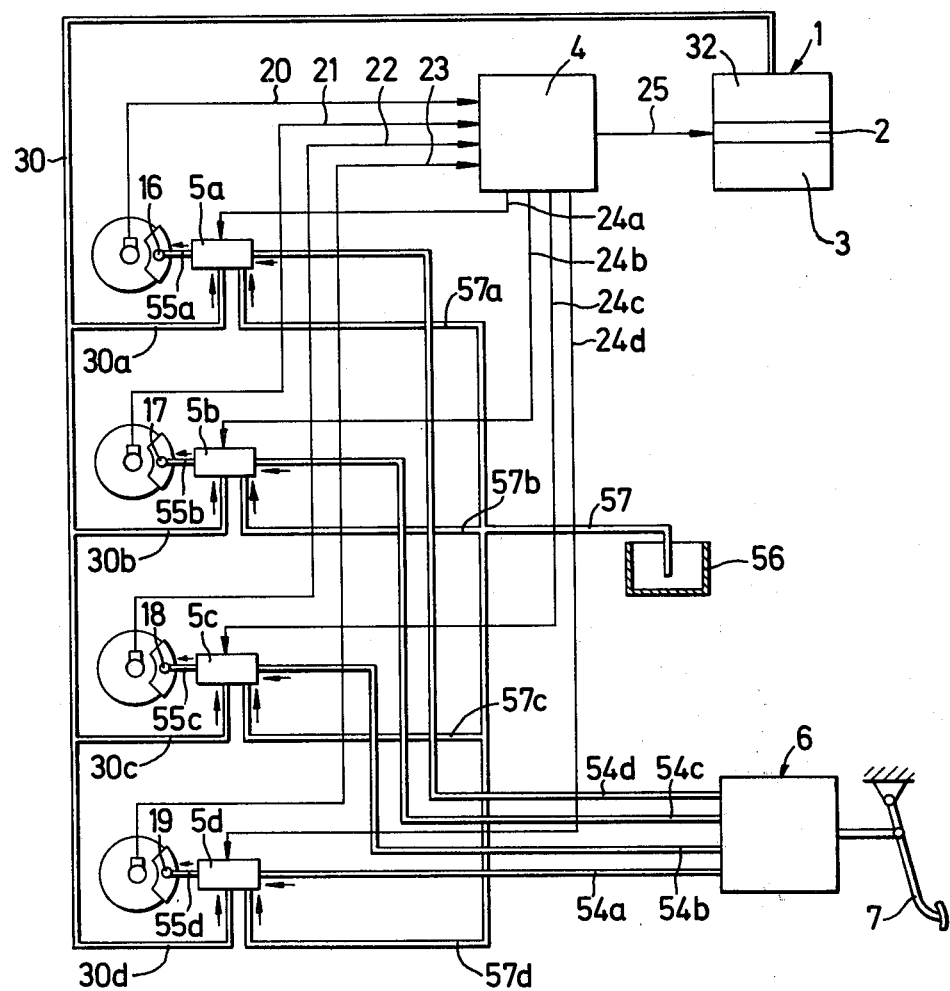
FIG. 5 is a block diagram of a fourth embodiment of a brake slip control apparatus in accordance with the principles of the present invention.

Further advantages could be achieved in the brake slip control apparatuses described if the pressure control unit 5 of the previous embodiments is subdivided into individual pressure control units 5a, 5b, 5c and 5d as shown in FIG. 5, resulting in extremely short pressure lines 55a, 55b, 55c and 55d between pressure control devices and wheel brake cylinders 16, 17, 18 and 19. In the limiting case, wheel brake cylinders 16, 17, 18 and 19 are formed integrally with the associated individual pressure control units 5a, 5b, 5c and 5d so that lines 55a, 55b, 55c and 55d are dispensed with completely. In this case, the following lines lead to each wheel brake cylinders 16, 17, 18 and 19. From pressure source 1 lines 30, from brake booster 6 lines 54, to return reservoir 56 lines 57, and from electronic control unit 4 electrical lines 24. The three pressure lines may be combined to form a multiple line. In addition, electrical lines 24 may also be integrated into this multiple line. The reduced length or the elimination of lines 55a, 55b, 55c and 55d consuming energy unnecessarily in the event of a brake pressure control action permits a material reduction in the required storage capacity of pressure source 1 with a given number of brake pressure cycles.

While I have described above the principles of my invention in connection with specific apparatus, it is to be clearly understood that this description is made only by way of example and not as a limitation to the scope of my invention as set forth in the objects thereof and in the accompanying claims.

I claim:

1. An arrangement to supply pressure to a brake slip control apparatus during braking operations of automotive vehicles comprising:
    a source of pressure fluid to supply necessary control pressure in wheel brake cylinders, said source of pressure fluid including
    a reservoir containing a pressure fluid coupled to a control arrangement of said slip control apparatus,
    a highly expansive medium disposed in said reservoir capable of acting on said pressure fluid in said reservoir, and
    a device associated with a selected one of said pressure fluid and said expansive medium connected to an electronic control unit of said slip control apparatus to actuate said device at the beginning of a braking operation having locked wheels to supply said pressure fluid to said control arrangement.

2. An arrangement according to claim 1, wherein
    said expansive medium is a pyrotechnic propellent, and
    said device is an ignition device associated with said expansive medium and connected to said electronic control unit,
    said ignition device upon actuation releasing said expansion medium to supply said pressure fluid to said control arrangement.

3. An arrangement according to claim 1, wherein
    a plurality of said source of pressure fluid are provided, each of said plurality of said source of pressure fluid being connected to said control arrangement and said control arrangement and said electronic control unit for sequential operation thereof, output lines of each of said plurality of said source of pressure fluid being isolated from each other by check valves permitting actuation of said plurality of said sources of pressure fluid independently of each other.

4. An arrangement according to claim 3, further including
    a plurality of elements each associated with a different one of said plurality of said source of pressure fluid to sense the status of use of the associated one of said plurality of said source of pressure fluid, and
    a different operator signalling device coupled to each of said plurality of elements.

5. An arrangement according to claim 4, wherein
    each of said plurality of elements includes a pressure-responsive switch connected to a different one of said reservoirs.

6. An arrangement according to claim 1, wherein
    said expansive medium is a highly pressurized gas present in a chamber of said reservoir acting on said pressure fluid, and
    said device is a valve connected between said reservoir and said control arrangement actuatable by said electronic control unit to supply said pressure fluid to said control arrangement.

7. An arrangement according to claim 6, further including
    a low-pressure accumulator connected to said control arrangement to receive said pressure fluid supplied to said control arrangement during a brake slip control action.

8. An arrangement according to claim 7, wherein said accumulator and said pressure source are each provided with a disconnect coupling for connection to said slip control apparatus.

9. An arrangement according to claim 7, wherein said accumulator and said pressure source are accommodated in a common housing.

10. An arrangement according to claim 9, wherein said common housing is provided with one disconnect coupling for connection to said slip control apparatus.

11. An arrangement according to claim 1, wherein said wheel brake cylinders number four, and
said control arrangement includes four pressure control units each connected to a different one of said four wheel brake cylinders.

12. An arrangement according to claim 11, wherein each of said four pressure control units are connected to said reservoir by first pressure lines, to a brake actuator by second pressure lines and to its associated one of said four wheel brake cylinders by third pressure lines, said first, second and third pressure lines being combined to provide a multiple hose line.

13. An arrangement according to claim 12, further including
electrical lines connected between said electronic control unit and four velocity sensors each associated with a different one of said four wheel brake cylinders, said electrical lines being integrated into said multiple hose line.

14. An arrangement according to claims 12 or 13, wherein
each of said four pressure control units are integrated with its associated one of said four wheel brake cylinders to enable eliminating said third pressure lines.

15. An arrangement according to claim 11, wherein each of said four pressure control units are integrated with its associated one of said four wheel brake cylinders.

* * * * *